April 7, 1970  AKIO YOSHIDA  3,504,573
DEVICE FOR CONTROLLING BENDING VIBRATION OF
VEHICLE DRIVE TRAIN SYSTEM
Filed June 27, 1968  5 Sheets-Sheet 1

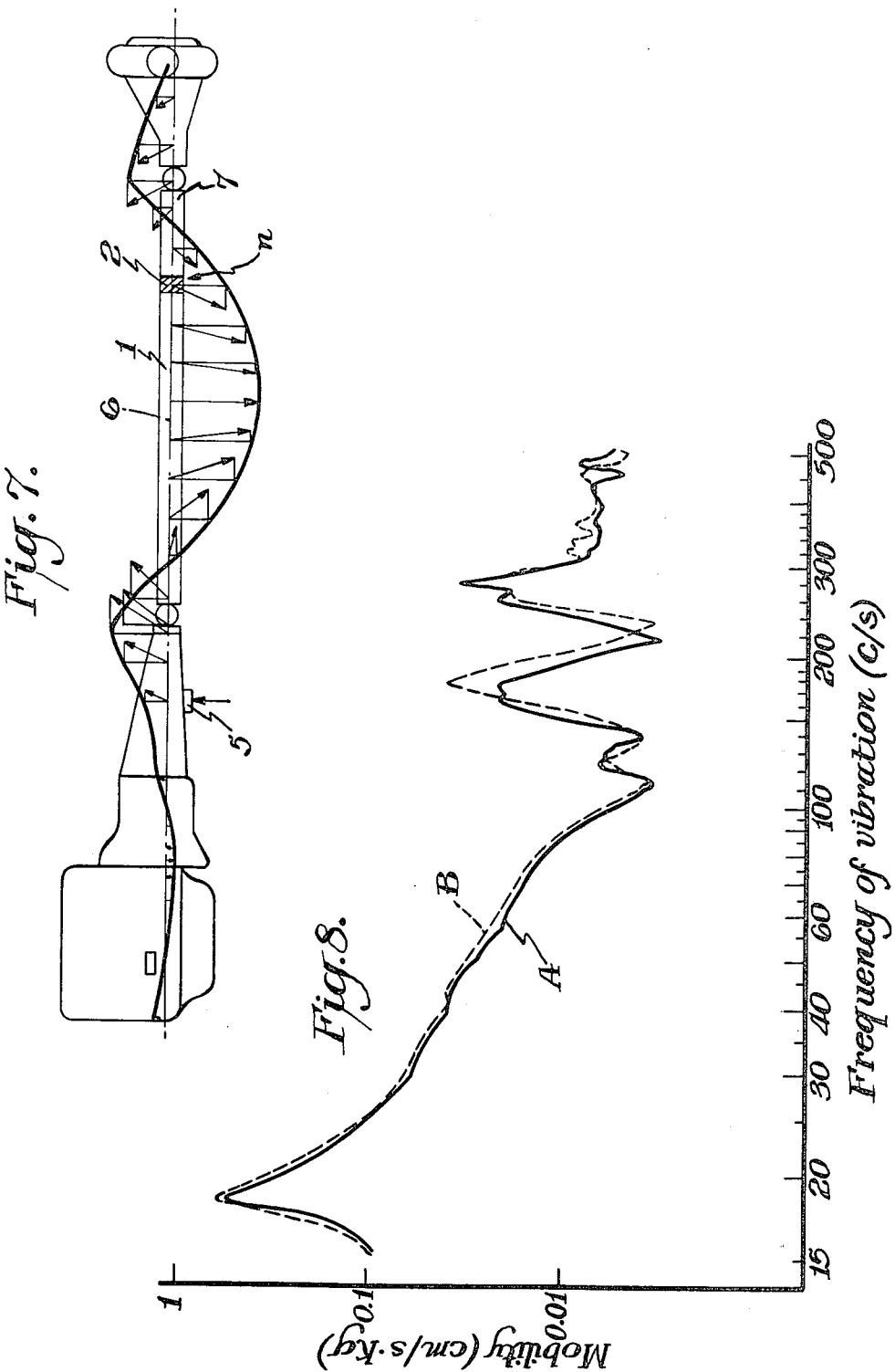

United States Patent Office 3,504,573
Patented Apr. 7, 1970

3,504,573
DEVICE FOR CONTROLLING BENDING VIBRATION OF VEHICLE DRIVE TRAIN SYSTEM
Akio Yoshida, Toyota, Japan, assignor to Toyota Jidosha Kogyo Kabushiki Kaisha, Toyota, Japan
Filed June 27, 1968, Ser. No. 740,754
Claims priority, application Japan, June 28, 1967, 42/41,882
Int. Cl. F16f *15/10*
U.S. Cl. 74—574   3 Claims

ABSTRACT OF THE DISCLOSURE

Bending vibation control device for drive train system of Hotchkiss drive vehicle comprises weight fitted on propeller shaft system coaxially therewith. Heaviness and position of the weight on shaft which transmits the driving force of the engine to the vehicle are interrelated to control bending vibration of drive train system.

BACKGROUND, OBJECTS AND SUMMARY OF THE INVENTION

In a Hotchkiss drive vehicle, the drive train consisting of the power plant, the propeller shaft which transmits the driving force of the engine to the vehicle, and the axle carrier is subjected to transverse vibrations (bending vibration) which arise from the shock of explosion in the engine or the whirling of the revolving shaft.

This vibration usually happens in high-speed revolution of the engine or high-speed running of the vehicle. The vibration is transmitted mainly through the rear mount of the engine to the vehicle body, often resulting in unpleasant vibration and noise inside the vehicle. The conventional countermeasure for this has been to increase the bending stiffness of the power plant itself or to design the propeller shaft in split type fashion, thereby abating the ill effects due to the bending vibration. Such countermeasures, however, entailing a increased complexity of structure and considerable cost, have seldom been adopted except for relatively expensive vehicles.

In view of above, the present invention provides an extremely simplified device realizing the effect of vibration control at low cost.

The primary object of the invention is to control the bending vibration of a drive train system by an extremely simple device based on the exploitation of the nature of transverse vibration in an elastic structure so as to be able to utilize most effectively the elastic elements and the damping elements distribution in the propeller shaft system, when a vibrating mass is secured to the propeller shaft which transmits the driving force of the engine to the vehicle.

Another object of the invention is to provide the effect of vibration control only in a certain frequency range of violent vibration by varying the heaviness and position of the weight and thereby producing a desired degree of the effect of vibration control.

BRIEF DESCRIPTION OF THE DRAWING

Novel features and advantages of the present invention in addition to those mentioned above will become apparent to one skilled in the art from a reading of the following detailed description in conjunction with the accompanying drawing wherein similar reference characters refer to similar reference characters refer to similar parts and in which:

FIGURE 7 shows the phase of vibration in relation to the drive train;

FIGURE 8 is a diagram comparing the frequency characteristic of mobility at the power plant engine rear mount position between presence of the vibration control device of the present invention and non-presence of it;

DETAILED DESCRIPTION OF THE INVENTION

Figure 1:
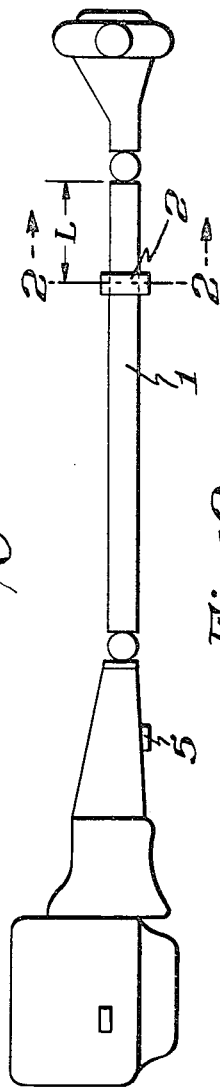
FIGURE 1 is a side elevational view of an embodiment according to the present invention.
Figure 2:
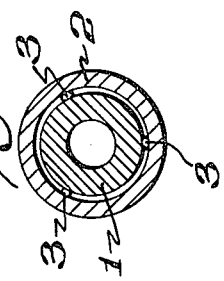
FIGURE 2 is a sectional view taken along line 2—2 of FIGURE 1.

FIGURES 1 and 2 illustrate an appropriately heavy weight 2 of a column or stepped column shape fitted into a definite position slightly rearward from the center on the outside of a hollow steel pipe propeller shaft 1 which transmits the driving force of the engine to the vehicle. The weight 2 is welded at portions 3 to the propeller shaft 1 and is coaxial therewith.

Figure 3:
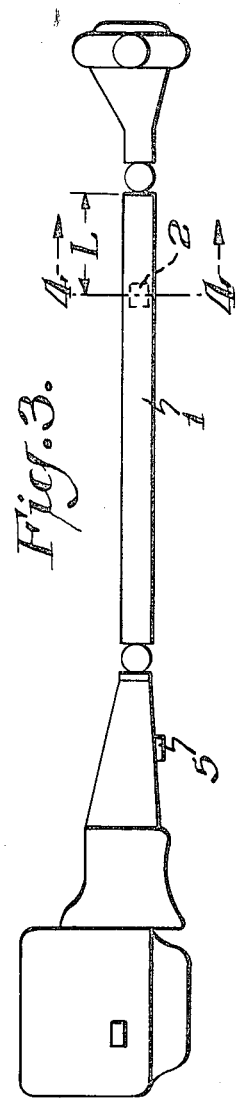
FIGURE 3 is a side elevational view of another embodiment according to the present invention.
Figure 4:
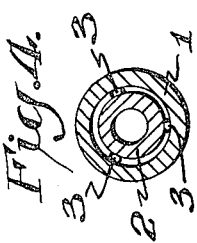
FIGURE 4 is a sectional view taken along line 2—2 of FIGURE 3.

FIGURES 3 and 4 illustrate a weight 2 fitted into a hollow steel pipe propeller shaft 1, welded at 3 thereto and coaxially fixed thereto.

Figure 5:
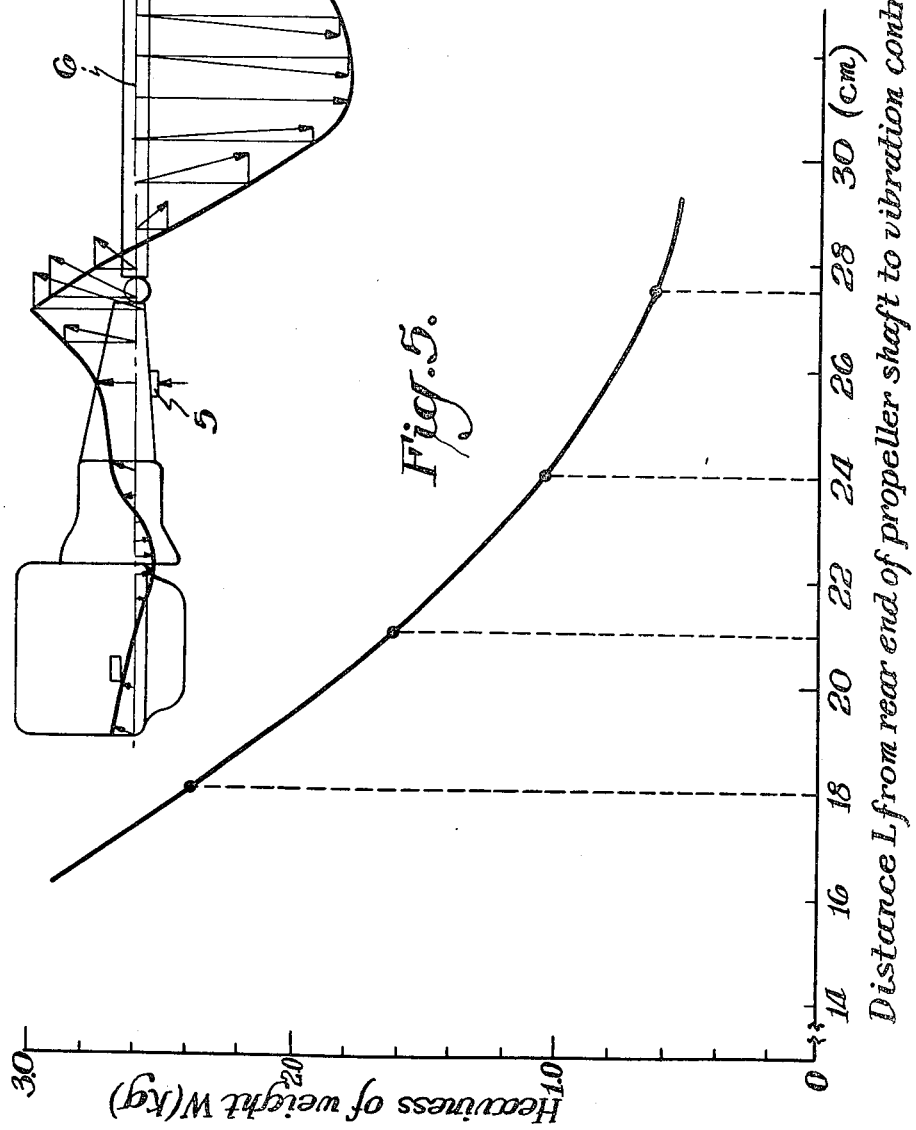
FIGURE 5 is a diagram representing the appropriate relation between the heaviness of the weight used in the vibration control device and the position of the weight on the propeller shaft which transmits the driving force of the engine to the vehicle.

In both the above cases, there exists between the heaviness W of the weight 2 and the distance L from the rear end of the propeller shaft 1 to the center of gravity of the weight 2 a definite correlation, as illustrated in FIGURE 5, which depends on the vibration characteristics of the drive train system of a given vehicle. Thus, when the heaviness W of the weight 2 or its position is known, the other is automatically determined.

Figure 6:
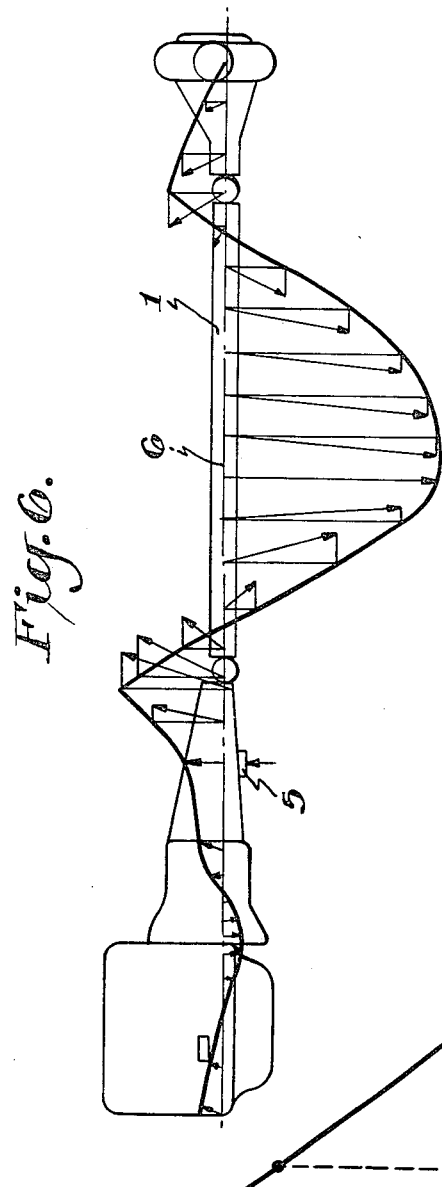
FIGURE 6 shows the natural vibration mode occurring in the drive train.

Among the natural bending vibrations of the drive train system of a Hotchkiss drive vehicle, the harmful mode is one represented by FIGURE 6. The point of 180° phase difference from the vibration phase at the engine rear mount position 5 falls nearly on the midpoint, the point 6 reaching the maximum amplitude of the propeller shaft.

Now, suppose a weight 2 with definite heaviness is, as indicated in FIGURE 7, attached to a certain position $n$ between the rear end and the midpoint of the propeller shaft 1. Then it will be possible to make such adjustment that the vibration of the weight 2 may resonate exactly with 180° phase difference from the rear mount position 5. Namely, if the weight 2 with definite heaviness is fitted at a certain position between the rear end 7 of the propeller shaft 1 and the point 6 of a maximum amplitude there is a point—and only one point—between the point 6 of maximum amplitude and the rear end 7 of the propeller shaft where the weight 2 can resonate in a given vibration mode with 180° phase difference from the rear mount position 5.

When the above condition is satisfied the weight performs the function of a sort of a dynamic vibration absorber which utilizes effectively the elasticity and damping characteristics structurally distributed in the propeller shaft. Thus, a relatively light weight exhibits a great effect on vibration control.

Figure 9:
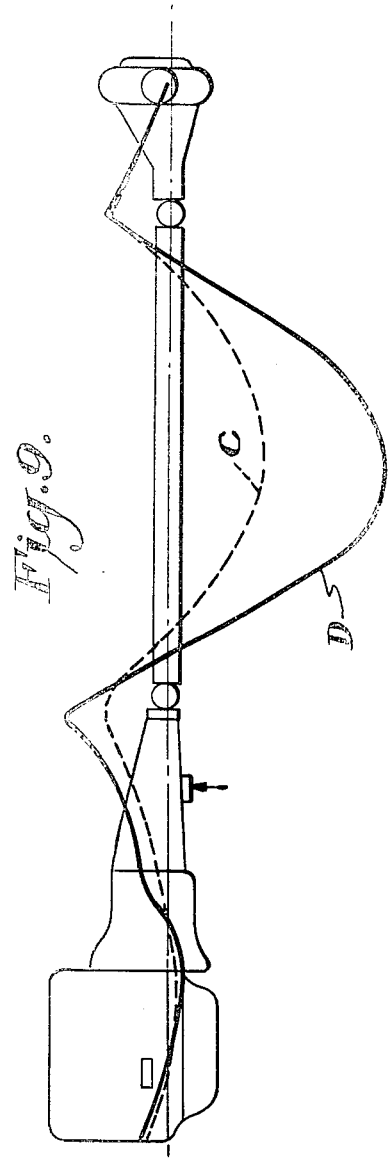
FIGURE 9 illustrates the effect of vibration control in terms of the vibration mode of the drive train system.

FIGURES 8 and 9 illustrate a comparison between presence of a 1.04 kg.-weight vibration control device and non-presence of it with the drive shaft system in terms of frequency characteristic of mobility and natural vibration mode at the rear mount position, the solid line A in FIGURE 8 representing the vehicle with the weight and the dotted line B representing the vehicle with no such weight. In FIGURE 9, the dotted line C represents the vehicle with weight (natural frequency $f_r=169$ c./s.) and the solid line D represents the vehicle with no weight (natural frequency $f_r=176$ c.s.). In both FIGURES 8 and 9, presence of the vibration control device of the instant invention is shown to have the effect of reducing the value of mobility.

Figure 10:
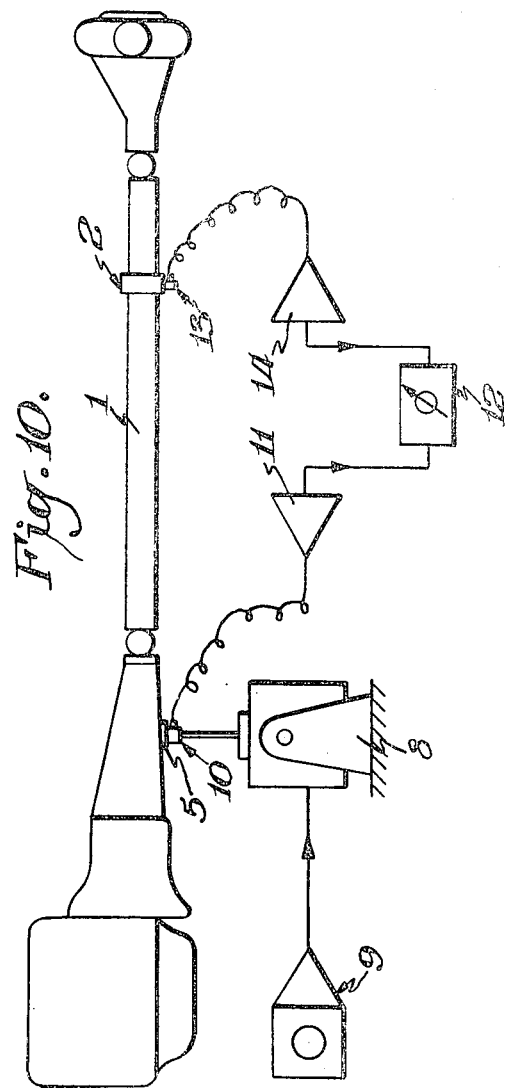
FIGURE 10 illustrates the method for determining the fitting position of the vibration control device.

Referring to FIGURE 10, the method for determining the fitting position of the vibration control device with a given weight on the propeller shaft 1 in a finished vehicle is illustrated. In FIGRE 10, 8 is a vibrator, 9 is a controller for the vibrator, 10 is an accelerometer attached to the acting point of the vibrator, 11 is an amplifier for the accelerometer 10, 12 is a phase meter, 13 is an accelerometer attached to the weight 2 for vibration control, and 14 is an amplifier for the accelerometer 13. When the heaviness of the weight 2 is decided, an approximate position of fitting the weight is known from FIGURE 5; and accordingly the weight as a vibration control device can be attached to the propeller shaft 1.

The vibrator 8 is so located as to be able to apply an exciting force to the rear mount position 5 of the power plant. From the mobility characteristic at this point of exciting force the bending natural frequency of the drive train is found. A vibration with this bending natural frequency of the drive train is found. A vibration with this bending natural frequency is applied to the point of exciting force. The phase difference between the accelerometer 10 and the accelerometer 13 is measured by the phase meter 12. Based on the result, the position of the weight 2 is so adjusted as to make the phase difference equal to 180°, and the weight 2 is fitted to the propeller shaft 1 at the position where the phase difference becomes equal to 180°. Once the fitting position of the vibration control device with a given weight is thus selected, any identical device with the given weight may be fitted at the same position inside the propeller shaft 1 and fixed there, with the same effect of vibration control.

In a practical vehicle, the bending vibration of the drive train system differs in the natural frequency and in the natural mode to some extent between vertical and horizontal directions. Therefore, in the selection of an appropriate position for the vibration control device, the selection of the natural mode and the consideration of the influence of the rotation of the propeller shaft are important.

Figure 11:
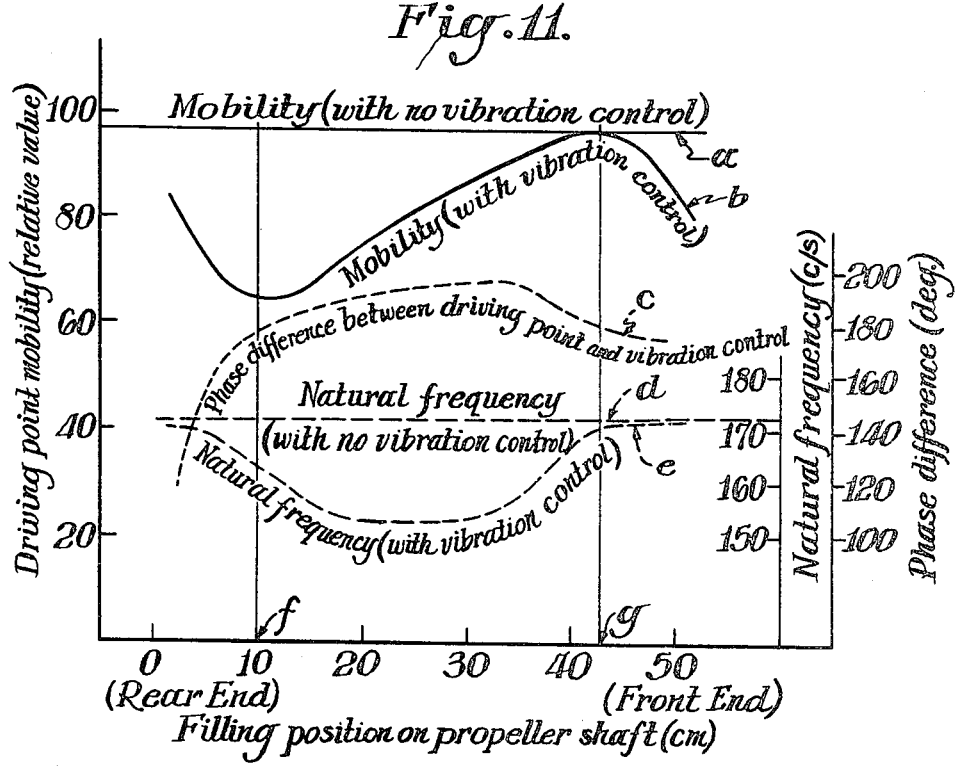
FIGURE 11 is a diagram representing the influence of the fitting position of the vibration control device with a given weight upon the vibration characteristics of the drive train system.

FIGURE 11 illustrates the influence of the fitting position on the propeller shaft of the vibration control device with a given weight, upon the driving point mobility at resonance frequency of the vibration system, upon the phase difference between driving point and vibration control device and upon the natural frequency of vibration.

In FIGURE 11, $a$ and $b$ are the curves representing the driving point mobility at resonance frequency respectively for presence of the vibration control device and for non-presence of such a device. The curve representing the phase difference between driving and vibration control device is $c$, and $d$ and $e$ are respectively the curves representing the natural frequency of vibration for respective cases of the vibration control device being present or not.

In this example, the driving point mobility reaches a minimum at the position $f$ on the propeller shaft and at this position the phase difference between the driving point and the vibration control device is equal to 180°, but the natural frequency of vibration is lower than in the non-presence of the vibration control device. Therefore, when the tuning is done taking into account the change in the natural frequency of vibration as well as mobility and phase difference, the appropriate fitting position of the vibration control device with the actual running condition considered will fall slightly rearward from the position $f$. The positions generally meeting this condition will include a region forward from the position $g$ in addition to the position $f$.

Figure 12:
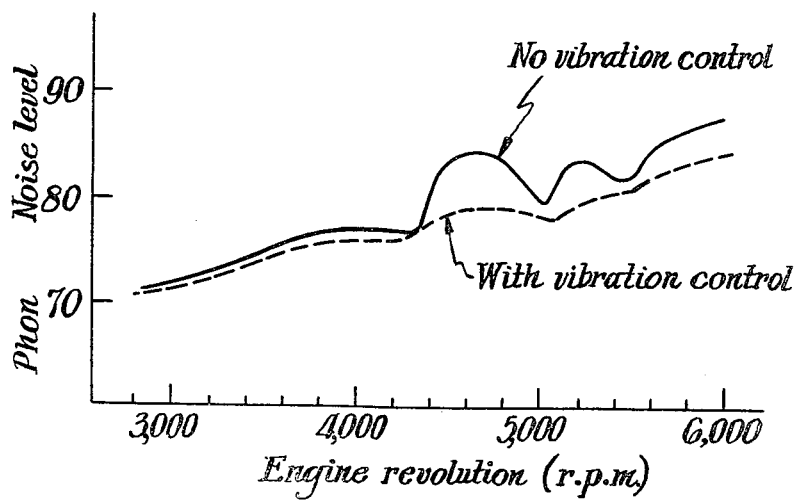
FIGURE 12 is a diagram illustrating the interior noise of a vehicle under accelerated running at full throttle.

FIGURE 12 compares the front seat noise under accelerated running at full throttle between presence and non-presence of the vibration control device. It testifies that the presence of the vibration control device results in less interior noise.

What is claimed is:
1. In a Hotchkiss drive vehicle having a drive train system including a propeller shaft for transmitting driving force of the engine to the vehicle and a support point for the drive train system, the improvement according to which the propeller shaft has a single weight of predetermined heaviness secured thereto and coaxial therewith, the position of the weight on the propeller shaft being such that the bending vibration produced thereby occurs at approximately 180° phase difference from the natural vibration mode between the support point of the drive train system and the weight whereby mobility of the support point at natural vibration is reduced and the bending vibration of the drive train system is controlled.

2. The combination of claim 1 in which the weight is secured to the outside of the propeller shaft.

3. The combination of claim 1 in which the propeller shaft is hollow and the weight is secured inside the hollow shaft.

References Cited

UNITED STATES PATENTS

| | | | |
|---|---|---|---|
| 1,627,936 | 5/1927 | Swenson | 74—574 XR |
| 1,645,323 | 10/1927 | Griswold. | |
| 1,645,343 | 10/1927 | Moorhouse. | |
| 2,001,165 | 5/1935 | Swennes. | |
| 3,425,239 | 2/1969 | Baier | 74—574 XR |

MARK NEWMAN, Primary Examiner

F. D. SHOEMAKER, Assistant Examiner

U.S. Cl. X.R.

180—70